United States Patent
Vitale

(10) Patent No.: US 12,081,848 B2
(45) Date of Patent: Sep. 3, 2024

(54) MULTIFUNCTIONAL HEATSINK

(71) Applicant: GoPro, Inc., San Mateo, CA (US)

(72) Inventor: Nicholas Vitale, Foster City, CA (US)

(73) Assignee: GoPro, Inc., San Mateo, CA (US)

(*) Notice: Subject to any disclaimer, the term of this patent is extended or adjusted under 35 U.S.C. 154(b) by 39 days.

(21) Appl. No.: 17/901,990

(22) Filed: Sep. 2, 2022

(65) Prior Publication Data

US 2024/0073500 A1 Feb. 29, 2024

Related U.S. Application Data

(63) Continuation-in-part of application No. 17/893,673, filed on Aug. 23, 2022.

(51) Int. Cl.
*H04N 23/52* (2023.01)
*H04N 23/51* (2023.01)

(52) U.S. Cl.
CPC ............ *H04N 23/52* (2023.01); *H04N 23/51* (2023.01)

(58) Field of Classification Search
CPC .............................. H04N 23/52; H04N 23/51
USPC ........................................................ 348/374
See application file for complete search history.

(56) References Cited

U.S. PATENT DOCUMENTS

| | | | |
|---|---|---|---|
| 5,471,027 A | 11/1995 | Call | |
| 6,097,598 A | 8/2000 | Miyahara | |
| 7,329,869 B2 | 2/2008 | Cassel | |
| 9,025,080 B2 | 5/2015 | Samuels | |
| 9,860,970 B2 | 1/2018 | Tolbert | |
| 9,910,342 B2 | 3/2018 | Samuels | |
| 10,613,420 B2 | 4/2020 | Ali | |
| 10,656,689 B2 | 5/2020 | Kilgore | |
| 10,701,249 B1 | 6/2020 | Guo | |
| 11,146,711 B1 | 10/2021 | Crow | |
| 11,277,545 B2 | 3/2022 | Crow | |
| 2003/0128536 A1* | 7/2003 | Radu | H05K 9/0016 361/818 |
| 2003/0202328 A1 | 10/2003 | Deeney | |
| 2004/0169771 A1 | 9/2004 | Washington | |
| 2006/0100336 A1 | 5/2006 | Fukui | |

(Continued)

FOREIGN PATENT DOCUMENTS

| | | |
|---|---|---|
| CN | 110235059 | 9/2019 |
| CN | 110235059 A | 9/2019 |

(Continued)

OTHER PUBLICATIONS

International Search Report and Written Opinion for App. No. PCT/US2021/019970, dated Jun. 3, 2021, 9 pages.

(Continued)

*Primary Examiner* — Joel W Fosselman
(74) *Attorney, Agent, or Firm* — Young Basile Hanlon & MacFarlane, P.C.

(57) ABSTRACT

An image capture device includes a housing and a heatsink that forms an integral portion of the housing and draws heat from a heat generating component of the heatsink. The image capture device includes a circuit board enclosed by the housing and comprising a chip. The image capture device includes a gasket that connects the heatsink and the circuit board. The gasket encloses sides of the chip and the heatsink encloses a top of the chip so that electromagnetic interference does not affect other components of the image capture device.

20 Claims, 7 Drawing Sheets

(56) References Cited

U.S. PATENT DOCUMENTS

| | | |
|---|---|---|
| 2008/0056695 A1 | 3/2008 | Huang |
| 2008/0205881 A1 | 8/2008 | Sakurai |
| 2009/0274953 A1 | 11/2009 | Myers |
| 2010/0296805 A1 | 11/2010 | Mayer |
| 2011/0127912 A1 | 6/2011 | Lee |
| 2011/0194009 A1 | 8/2011 | Park |
| 2012/0035418 A1 | 2/2012 | Talbert |
| 2014/0055671 A1 | 2/2014 | Kawamura |
| 2014/0104479 A1 | 4/2014 | Samuels |
| 2014/0160284 A1 | 6/2014 | Achenbach |
| 2015/0049243 A1 | 2/2015 | Samuels |
| 2015/0365569 A1 | 12/2015 | Mai |
| 2016/0174408 A1 | 6/2016 | Tolbert |
| 2016/0334692 A1 | 11/2016 | Samuels |
| 2016/0349601 A1 | 12/2016 | Kungl |
| 2016/0374190 A1* | 12/2016 | Tolbert .................. H04N 23/52 |
| 2017/0070652 A1 | 3/2017 | Müller |
| 2017/0156205 A1 | 6/2017 | Liu |
| 2017/0195531 A1 | 7/2017 | Warren |
| 2017/0195533 A1 | 7/2017 | Seo |
| 2017/0200992 A1 | 7/2017 | Piggott |
| 2017/0294694 A1 | 10/2017 | Tso |
| 2018/0107099 A1 | 4/2018 | Yasuda |
| 2018/0259831 A1 | 9/2018 | Chiu |
| 2019/0041600 A1 | 2/2019 | Sakamoto |
| 2019/0056643 A1 | 2/2019 | Chang |
| 2019/0163037 A1 | 5/2019 | Koyama |
| 2019/0346126 A1 | 11/2019 | Wada |
| 2020/0033774 A1 | 1/2020 | Shinji |
| 2020/0064533 A1 | 2/2020 | Miyazaki |
| 2020/0344395 A1 | 10/2020 | Guo |
| 2020/0413567 A1* | 12/2020 | Chusseau ................ H04R 3/00 |
| 2021/0033815 A1 | 2/2021 | Lin |
| 2021/0122299 A1 | 4/2021 | Garcia |
| 2021/0274067 A1 | 9/2021 | Crow |
| 2021/0306536 A1 | 9/2021 | Vitale |
| 2021/0321027 A1 | 10/2021 | Crow |
| 2021/0344819 A1 | 11/2021 | Vitale |
| 2022/0021795 A1 | 1/2022 | Crow |
| 2022/0124226 A1 | 4/2022 | Jeong |
| 2022/0159148 A1 | 5/2022 | Crow |
| 2023/0009451 A1 | 1/2023 | Connolly |
| 2024/0073499 A1 | 2/2024 | Vitale |
| 2024/0073506 A1 | 2/2024 | Vitale |

FOREIGN PATENT DOCUMENTS

| | | |
|---|---|---|
| JP | 2004020798 | 1/2004 |
| JP | 2004020798 A | 1/2004 |
| JP | 2006086752 A | 3/2006 |
| JP | 2008015476 A | 1/2008 |
| JP | 5322866 B2 | 10/2013 |
| JP | 2017073634 | 4/2017 |
| JP | 2017073634 A | 4/2017 |

OTHER PUBLICATIONS

International Search Report and Written Opinion for App. No. PCT/US2021/026140, dated Jul. 1, 2021, 10 pages.

U.S. Appl. No. 16/803,139, filed Feb. 27, 2020, Crow et al.

* cited by examiner

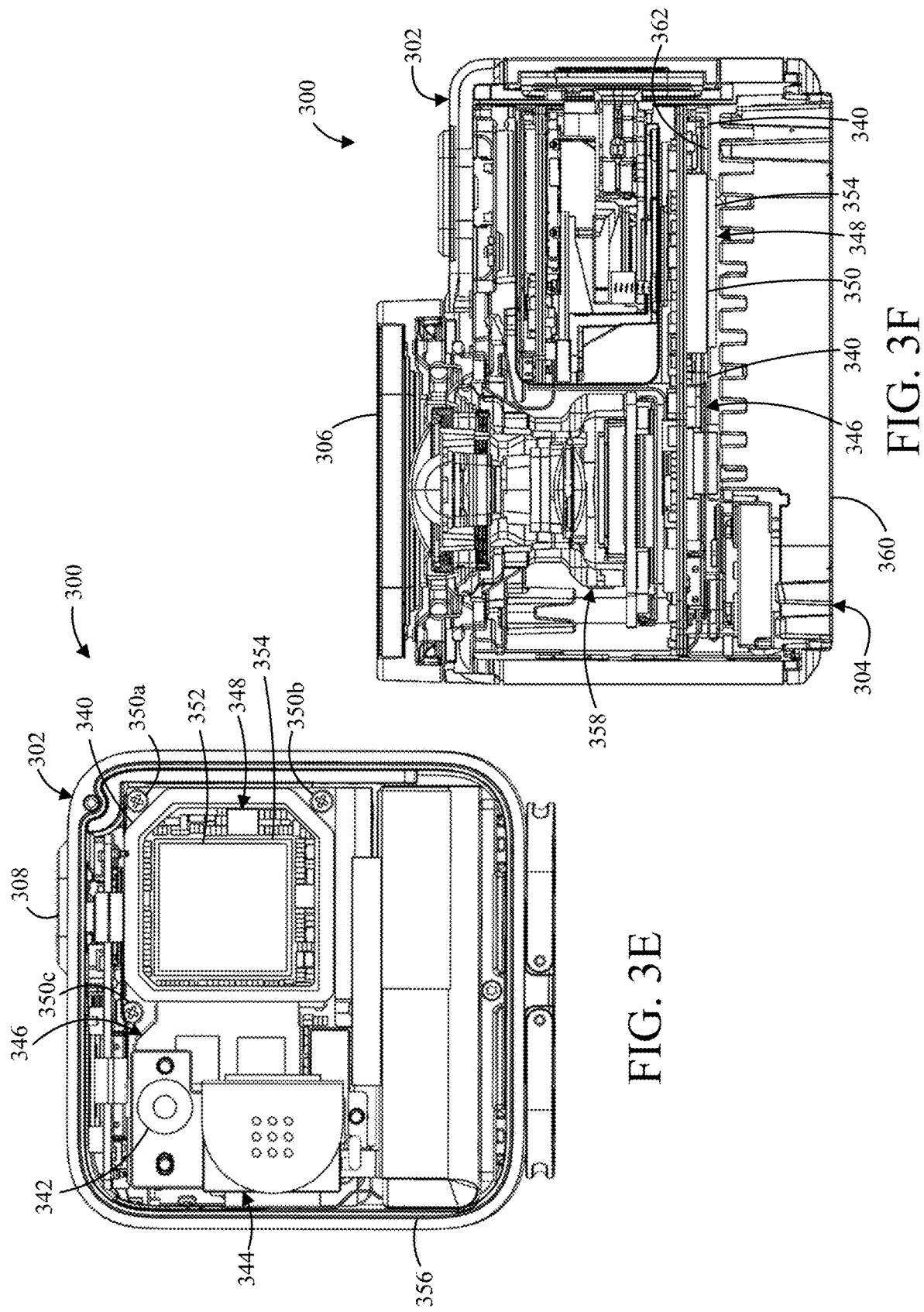

MULTIFUNCTIONAL HEATSINK

CROSS-REFERENCE TO RELATED APPLICATIONS

This application is a continuation in part of U.S. application Ser. No. 17/893,673 filed on Aug. 23, 2022, which is incorporated herein in its entirety.

TECHNICAL FIELD

This disclosure relates to a heatsink that is integrated with the housing of a camera.

BACKGROUND

Image capture devices generate significant amounts of energy in the form of heat during detection of images and videos. If heat is allowed to build within the image capture device without any management, electrical components will begin to overheat, which can inhibit or prevent performance of image detection, and the time of operation for the image capture device can be limited. Accordingly, a user may have to wait until the image capture device cools down such that the internal electrical components have a temperature that is operable. One method to increase heat dissipation is to use a heatsink that can absorb significant amounts of heat. One challenge in using heatsinks is efficiently directing heat away from electrical components that are susceptible to overheating to maximize an amount of heat that can be absorbed by the heatsinks without sacrificing functional space for other components or reducing aesthetic appeal of the image capture device. Accordingly, what is needed is a heatsink that efficiently manages heat without reducing functionality of the image capture device.

SUMMARY

Disclosed herein are heatsinks and image capture devices.

One implementation of an image capture device includes a housing and a heatsink that forms an integral portion of the housing and draws heat from a heat generating component of the heatsink. The image capture device includes a circuit board enclosed by the housing and comprising a chip and a gasket that connects the heatsink and the circuit board. The gasket encloses sides of the chip, and the heatsink encloses a top of the chip so that electromagnetic interference does not affect other components of the image capture device.

The housing and the heatsink may be sealed so that water is prevented from entering an inside of the housing. The heatsink may include one or more audio components that are integrated with the heatsink. The heatsink may include fins that extend from an external surface of the heatsink and are configured to dissipate heat. The gasket may be composed of a material that is configured to block and/or mitigate electromagnetic interference. The heatsink may include at least one surface that is exposed to an external environment. The housing may include an open side so that the image capture device is enclosed on all side except for the open side, and the heatsink may connect with the housing so that the open side is closed by the heatsink.

Another implementation of an image capture device includes a housing that comprises an opening. The image capture device includes one or more electrical components and a heatsink composed of an electrically conductive material and configured to draw heat from a heat generating component of the image capture device. The heatsink includes one or more connectors that accept electricity from the electrical component and fins that dissipate heat from the electrical component.

The heatsink may be connected with the housing at the opening so that the fins of the heatsink extend outside of the housing. The heatsink and the housing may form a body that houses the one or more electrical components. The one or more electrical components may comprise a speaker, a microphone, a button configured to actuate; display, imaging sensor, battery, printed circuit board, or any other component that utilizes electricity. The one or more electrical components may be integrated with the external surface of the housing. The one or more electrical components may be encased wholly within the housing. The one or more electrical components may be encased within the housing and are integrated with the external surface of the housing. The heatsink may further include an interconnect mechanism that rotate relative to the heatsink and to connect with an external accessory.

Another implementation of a heatsink includes fins that extend from the heatsink and an indent defined within the fins. The heatsink includes an interconnect mechanism connected with the heatsink at the indent, and the interconnect mechanism are composed of a material configured to dissipate heat. The interconnect mechanism rotates relative to the indent between open and closed positions.

The heatsink may further include a microphone integrated within the fins or positioned behind the fins. The microphone and the heatsink may be connected electrically so that the heatsink is configured to accept electricity from the microphone. The heatsink may include a speaker integrated within the fins or positioned behind the fins. The speaker and the heatsink may be connected electrically so that the heatsink accepts electricity from the speaker. The interconnect mechanism may further include that rotate relative to the heatsink and to connect with an external accessory.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3E is a rear view of the image capture device of FIG. 3A with the heatsink removed.

FIG. 3F is a cross sectional view of the image capture device of FIG. 3A along line VI-VI.

DETAILED DESCRIPTION

The present disclosure provides a heatsink that forms an integral portion of the external housing of an image capture device and integrates additional components so that the entire external surface of the image capture device is utilized for heat transfer. Specifically, by providing integration of interconnect mechanisms, a microphone, and/or a speaker within the surface of the heatsink, the image capture device has a heatsink with a large surface area and heat density because the heatsink extends across an entire surface of the image capture device. In addition to heat dissipation, this provides allows connection with one or more external accessories at the interconnect mechanisms and provides increased sound projection and reception. The heatsink integrates multiple additional functionalities to supplement management of heat loads, such as providing electrical grounding for the integrated components of the heatsink and blocking of electromagnetic interference between internal electronics of the image capture device. With all of these features, the disclosed heatsink provides a multi-functional platform that can be integrated with an external housing of an image capture device or similar heat producing electronic device.

Figure 1A:
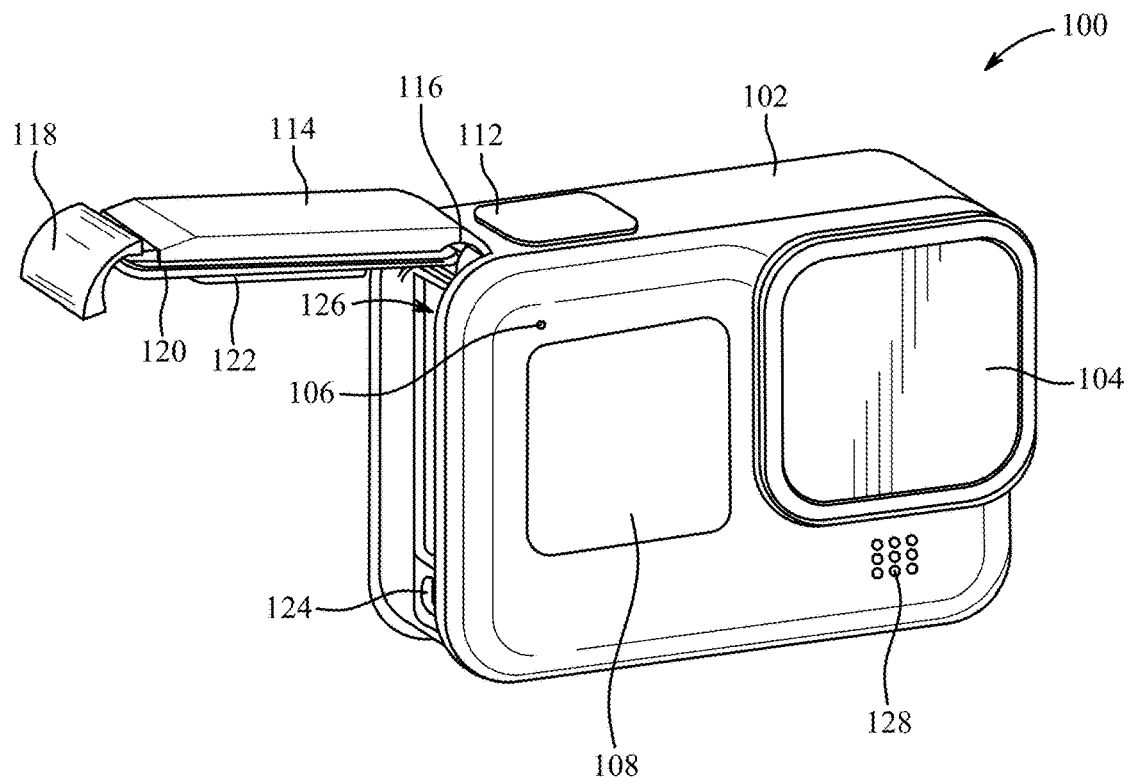
FIGS. 1A-B are isometric views of an example of an image capture device.
Figure 1B:
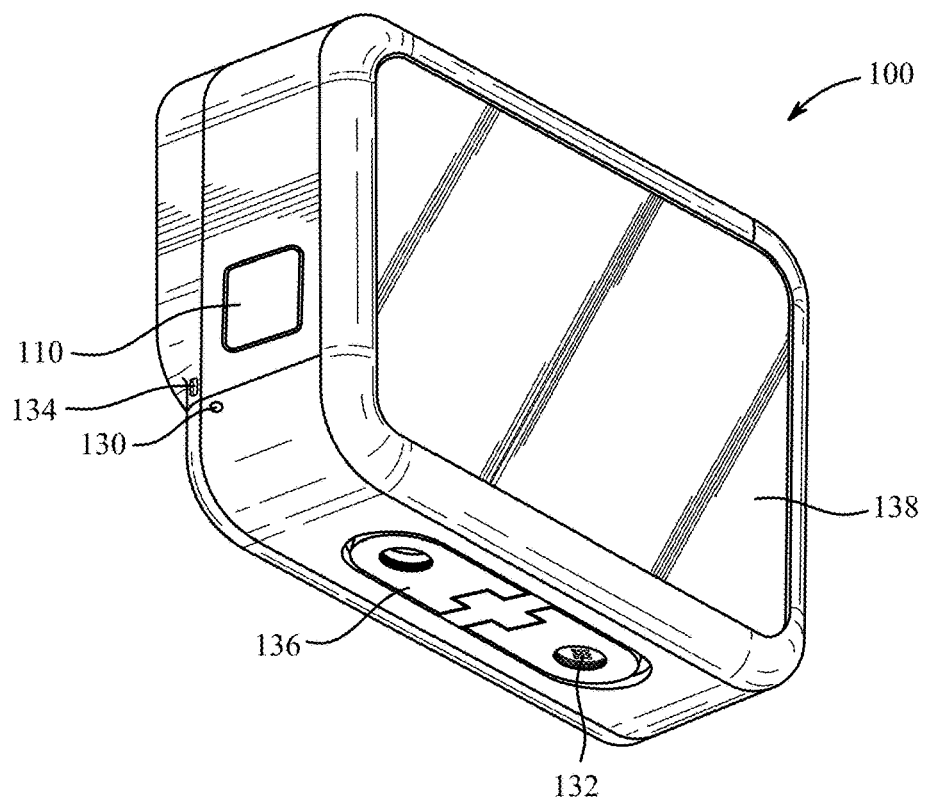

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
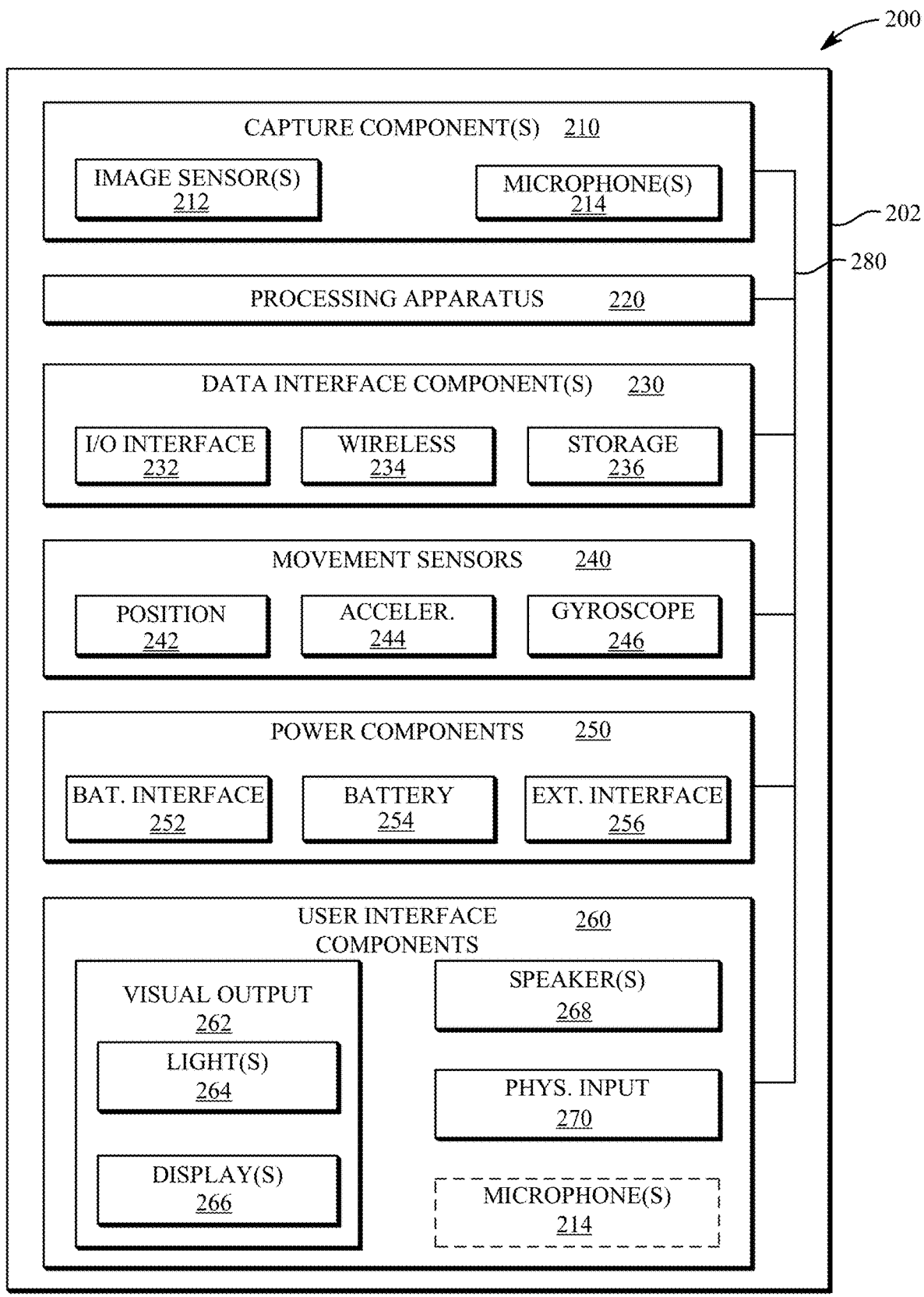
FIG. 2 is a block diagram of electronic components of an image capture device.

FIG. 2 is a block diagram of electronic components in an image capture device 200. The image capture device 200 may be a single-lens image capture device, a multi-lens image capture device, or variations thereof, including an image capture device with multiple capabilities such as use of interchangeable integrated sensor lens assemblies. The description of the image capture device 200 is also applicable to the image capture device 100 of FIGS. 1A-B.

The image capture device 200 includes a body 202 which includes electronic components such as capture components 210, a processing apparatus 220, data interface components 230, movement sensors 240, power components 250, and/or user interface components 260.

The capture components 210 include one or more image sensors 212 for capturing images and one or more microphones 214 for capturing audio.

The image sensor(s) 212 is configured to detect light of a certain spectrum (e.g., the visible spectrum or the infrared spectrum) and convey information constituting an image as electrical signals (e.g., analog or digital signals). The image sensor(s) 212 detects light incident through a lens coupled or connected to the body 202. The image sensor(s) 212 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors.

Image signals from the image sensor(s) 212 may be passed to other electronic components of the image capture device 200 via a bus 280, such as to the processing apparatus 220. In some implementations, the image sensor(s) 212 includes a digital-to-analog converter. A multi-lens variation of the image capture device 200 can include multiple image sensors 212.

The microphone(s) 214 is configured to detect sound, which may be recorded in conjunction with capturing images to form a video. The microphone(s) 214 may also detect sound in order to receive audible commands to control the image capture device 200.

The processing apparatus 220 may be configured to perform image signal processing (e.g., filtering, tone mapping, stitching, and/or encoding) to generate output images based on image data from the image sensor(s) 212. The processing apparatus 220 may include one or more processors having single or multiple processing cores. In some implementations, the processing apparatus 220 may include an application specific integrated circuit (ASIC). For example, the processing apparatus 220 may include a custom image signal processor. The processing apparatus 220 may exchange data (e.g., image data) with other components of the image capture device 200, such as the image sensor(s) 212, via the bus 280.

The processing apparatus 220 may include memory, such as a random-access memory (RAM) device, flash memory, or another suitable type of storage device, such as a non-transitory computer-readable memory. The memory of the processing apparatus 220 may include executable instructions and data that can be accessed by one or more processors of the processing apparatus 220. For example, the processing apparatus 220 may include one or more dynamic random-access memory (DRAM) modules, such as double data rate synchronous dynamic random-access memory (DDR SDRAM). In some implementations, the processing apparatus 220 may include a digital signal processor (DSP). More than one processing apparatus may also be present or associated with the image capture device 200.

The data interface components 230 enable communication between the image capture device 200 and other electronic devices, such as a remote control, a smartphone, a tablet computer, a laptop computer, a desktop computer, or a storage device. For example, the data interface components 230 may be used to receive commands to operate the image capture device 200, transfer image data to other electronic devices, and/or transfer other signals or information to and from the image capture device 200. The data interface components 230 may be configured for wired and/or wireless communication. For example, the data interface components 230 may include an I/O interface 232 that provides wired communication for the image capture device, which may be a USB interface (e.g., USB type-C), a high-definition multimedia interface (HDMI), or a FireWire interface. The data interface components 230 may include a wireless data interface 234 that provides wireless communication for the image capture device 200, such as a Bluetooth interface, a ZigBee interface, and/or a Wi-Fi interface. The data interface components 230 may include a storage interface 236, such as a memory card slot configured to receive and operatively couple to a storage device (e.g., a memory card) for data transfer with the image capture device 200 (e.g., for storing captured images and/or recorded audio and video).

The movement sensors 240 may detect the position and movement of the image capture device 200. The movement sensors 240 may include a position sensor 242, an accelerometer 244, or a gyroscope 246. The position sensor 242, such as a global positioning system (GPS) sensor, is used to determine a position of the image capture device 200. The accelerometer 244, such as a three-axis accelerometer, measures linear motion (e.g., linear acceleration) of the image capture device 200. The gyroscope 246, such as a three-axis gyroscope, measures rotational motion (e.g., rate of rotation) of the image capture device 200. Other types of movement sensors 240 may also be present or associated with the image capture device 200.

The power components 250 may receive, store, and/or provide power for operating the image capture device 200. The power components 250 may include a battery interface 252 and a battery 254. The battery interface 252 operatively couples to the battery 254, for example, with conductive contacts to transfer power from the battery 254 to the other electronic components of the image capture device 200. The power components 250 may also include an external interface 256, and the power components 250 may, via the external interface 256, receive power from an external source, such as a wall plug or external battery, for operating the image capture device 200 and/or charging the battery 254 of the image capture device 200. In some implementations, the external interface 256 may be the I/O interface 232. In such an implementation, the I/O interface 232 may enable the power components 250 to receive power from an external source over a wired data interface component (e.g., a USB type-C cable).

The user interface components 260 may allow the user to interact with the image capture device 200, for example, providing outputs to the user and receiving inputs from the user. The user interface components 260 may include visual output components 262 to visually communicate information and/or present captured images to the user. The visual output components 262 may include one or more lights 264 and/or more displays 266. The display(s) 266 may be configured as a touch screen that receives inputs from the user. The user interface components 260 may also include one or more speakers 268. The speaker(s) 268 can function as an audio output component that audibly communicates information and/or presents recorded audio to the user. The user interface components 260 may also include one or more physical input interfaces 270 that are physically manipulated by the user to provide input to the image capture device 200. The physical input interfaces 270 may, for example, be configured as buttons, toggles, or switches. The user interface components 260 may also be considered to include the microphone(s) 214, as indicated in dotted line, and the microphone(s) 214 may function to receive audio inputs from the user, such as voice commands.

Figure 3A:
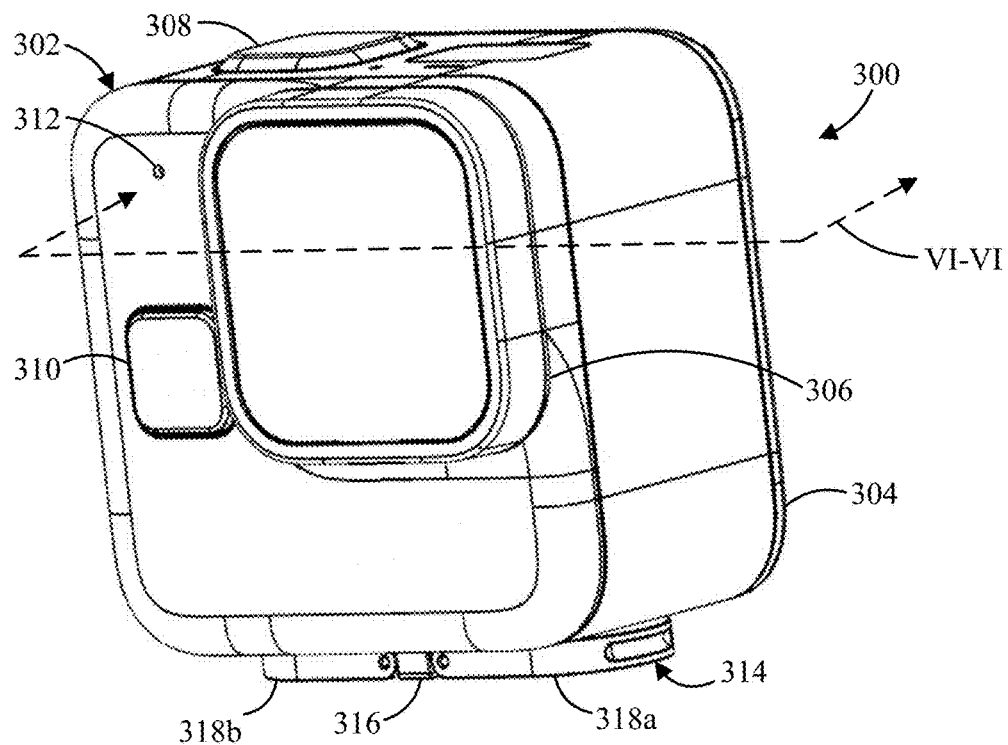
FIG. 3A is a perspective view of an image capture device.

FIG. 3A is a perspective view of an image capture device 300. The image capture device 300 is formed by combining a front housing 302 and a heatsink 304 at the rear of the front housing 302 such that a waterproof seal is formed between the front housing 302 and the heatsink 304. The front housing 302 includes a lens assembly 306 that is configured to detect images; buttons 308, 310 configured to control systems (e.g., image or video detection, light filtering, power, flash, etc.) related to image detection or processing; a front microphone aperture 312 configured to detect sound at a microphone (e.g., the microphone 342, 442 of FIGS. 3E, 4B); and bottom interconnect mechanism 314 configured to connect with an accessory device (not shown).

The buttons 308, 310 may have any configuration sufficient to activate a function of the image capture device 300. For example, the buttons 308, 310 may be configured to activate by switching, heat, actuation, or a time hold. In some examples, one or more additional buttons (not shown) may be integrated with the heatsink 304 so that additional space on the heatsink 304 is utilized for external components. In other examples, additional buttons (not shown) are integrated with the front housing 302 to control other functionalities.

Figure 4A:
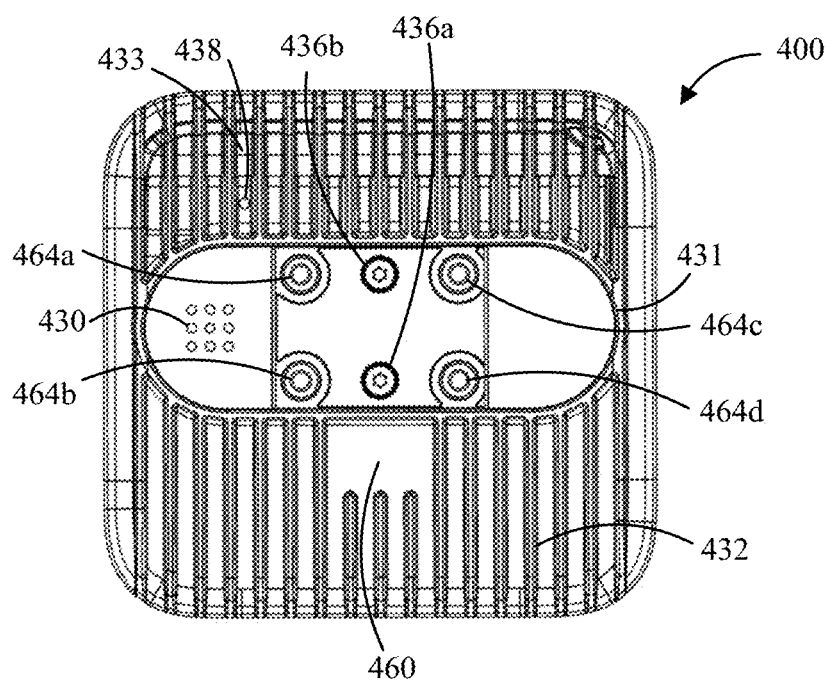
FIG. 4A is a rear view of the heatsink.
Figure 4B:
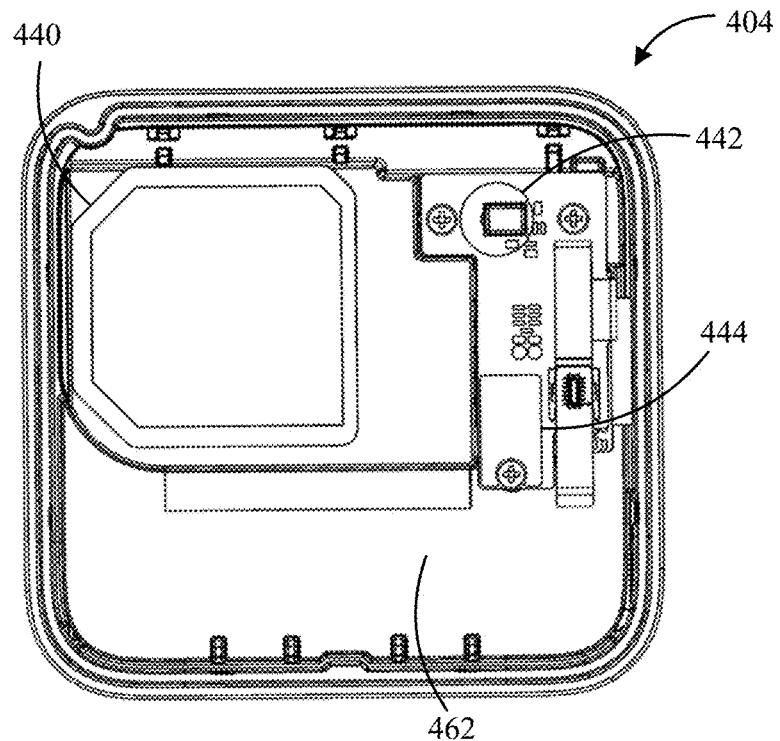
FIG. 4B is a front view of the heatsink of FIG. 4A.

The front microphone aperture 312 functions to provide a pathway to detect sounds via a microphone (e.g., the microphone 342, 442 of FIGS. 3E, 4B). The front microphone aperture 312 may have any size or configuration sufficient to allow the passage of sounds to the microphone (not shown) from the exterior environment. The front microphone aperture 312 may have a configuration such that no water and/or moisture passes through the front microphone aperture 312 while the image capture device 300 is being used in a wet environment. For example, the front microphone aperture 312 may include a sound permeable membrane that prevents water from entering the heatsink 304 and front housing 302.

The bottom interconnect mechanism 314 include a hinge 316 that connects bottom fingers 318a, 318b for the purpose of connecting an external accessory (not shown) and/or to dissipate heat from the image capture device 300. For example, heat from an internal component (not shown) may travel through the front housing 302 and to the bottom interconnect mechanism 314 so that additional heat is dissipated through the bottom interconnect mechanism 314. The bottom interconnect mechanism 314 may be affixed to the front housing 302 by any means sufficient to connect two components. For example, the bottom interconnect mechanism 314 may be affixed by four fasteners (not shown) that evenly secure the bottom interconnect mechanism 314 to a surface of the front housing 302. In other examples, the bottom interconnect mechanism 314 are affixed to the front housing 302 by more or less than four fasteners, an adhesive, or a disconnect-able connection (e.g., a snap fit or a sliding connection).

Figure 3B:
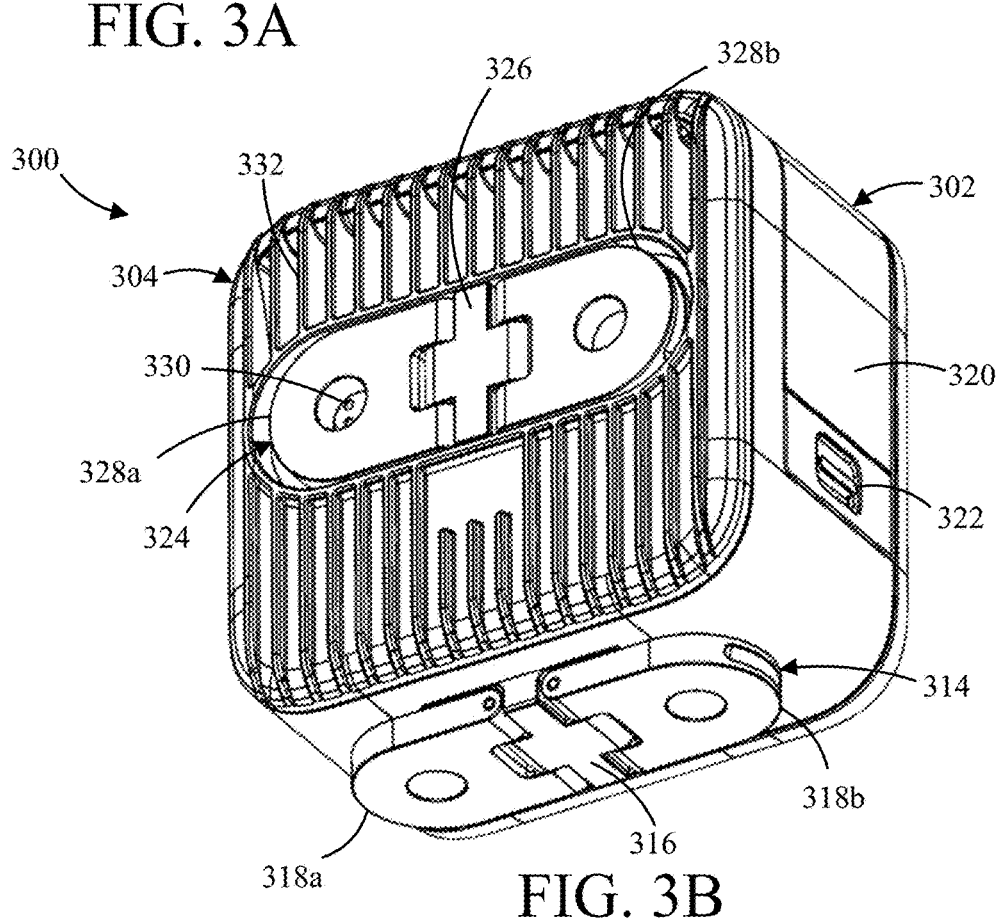
FIG. 3B is a perspective view of the image capture device of FIG. 3A.

FIG. 3B is a perspective view of the image capture device 300 of FIG. 3A. The front housing 302 includes a door 320 with a switch 322 that is configured to open the door 320. The heatsink 304 includes a rear interconnect mechanism 324 that are configured to connect with an external accessory (not shown) and/or dissipate additional heat from the heatsink 304. Because the bottom interconnect mechanism 314 and the rear interconnect mechanism 324 have different orientations, a hinge 326 of the rear interconnect mechanism 324 allows rotation of the rear fingers 328a, 328b in a different direction than the bottom fingers 318a, 318b will rotate about the hinge 316 relative to the heatsink 304 and the front housing 302. The different rotational direction for the bottom interconnect mechanism 314 and the rear interconnect mechanism 324 is advantageous to connect the bottom interconnect mechanism 314 and the rear interconnect mechanism 324 to different external accessories in different orientations or directions. For example, the bottom interconnect mechanism 314 may be connected to a selfie stick that is configured to adjust the angle of an image relative to an arm of a person, and the rear interconnect mechanism 324 may be connected with a screen mount that lets the user observe the predicted image before being detected through the lens assembly 306.

The rear interconnect mechanism 324 may be affixed to the heatsink 304 by any technique sufficient to secure two components, such as by fasteners (e.g., fasteners 336a, 336b, 336c, 336d of FIGS. 3C and 3F), an adhesive, or a disconnect-able connection (e.g., a snap fit or a slide-able connection). In some examples, no rear interconnect mechanism 324 are included to allow for additional components to be included on the heatsink 304 or to improve sound reception from a microphone (e.g., microphone 342, 442 of FIGS. 3E and 4B) or sound projection from a speaker (e.g., speaker 344, 444 of FIGS. 3E and 4B).

The bottom interconnect mechanism 314 are shown as separate from the heatsink 304, and in other examples, the bottom interconnect mechanism 314 may be connected to the heatsink 304 via a conductive material or component (not shown) that is internal or external to the front housing 302 so that the bottom interconnect mechanism 314 can dissipate additional heat from the heatsink 304. In other examples, a portion of the bottom interconnect mechanism 314 contacts a portion of the heatsink 304 so that some heat can be drawn and dissipated through the bottom interconnect mechanism 314. The amount of heat dissipated through the bottom interconnect mechanism 314 may be dependent on whether the bottom interconnect mechanism 314 are in a closed position (e.g., FIGS. 3A and 3B) or an open position (e.g., FIG. 3C). For example, additional heat may be dissipated through the bottom interconnect mechanism 314 and the rear interconnect mechanism 324 when in an open position.

The bottom interconnect mechanism 314 and rear interconnect mechanism 324 may be made of any material sufficient to connect with an external accessory (not shown). The bottom interconnect mechanism 314 and rear interconnect mechanism 324 may be made of any material sufficient to dissipate heat from the image capture device 300. For example, the bottom interconnect mechanism 314 and rear interconnect mechanism 324 may be made of metal, plastic, ceramic, or any combination thereof.

Behind the rear interconnect mechanism 324, a speaker port 330 is cut out of and/or integrated with the heatsink 304 and is connected with a speaker (e.g., speaker 344, 444 of FIGS. 3E and 4B). In addition to the function of dissipating heat, the heatsink 304 includes one or more other features, such as the speaker port 330, which allow the image capture device 300 to dissipate maximum heat through the heatsink 304 without losing a substantial portion of external surface that would be beneficial to other components, such as the speaker port 330. One reason that a user may want a speaker port 330 on the rear side of an image capture device 300 is so that the user can clearly hear alerts and/or instructions from the image capture device 300 during operation when the lens assembly 306 is pointed away from the user. In some examples, the speaker port 330 is positioned behind one or more openings of the bottom fingers 318a, 318b so that more sound can be projected from the side of the image capture device 300 where the heatsink 304 is positioned. In some examples, one or more speaker ports (not shown) may be positioned between fins 332 of the heatsink 304 so that surface area between the fins 332 can be utilized, while heat is being efficiently dissipated through the heatsink 304.

The speaker port 330 may have any configuration sufficient to facilitate movement of sound without compromising the waterproofing properties of the heatsink 304. The speaker port 330 may have any number of apertures sufficient to facilitate movement of sound from the speaker (e.g., speaker 344, 444 of FIGS. 3E and 4B). The speaker port 330 may be positioned such that sound can be emitted from the speaker (e.g., speaker 344, 444 of FIGS. 3E and 4B) in an unhindered fashion and without being blocked by the rear finger 328a. In FIG. 3B, the speaker port 330 is positioned behind the rear finger 328a such that sound is emit-able without being completely blocked by the rear finger 328a in a closed position (e.g., FIG. 3B) or an extended position (e.g., FIG. 3C). In other configurations, the speaker port 330 is positioned behind the rear finger 328b, and another component, such as a microphone aperture (not shown behind the rear fingers 328a, 328b), may be positioned behind the rear finger 328a.

For dissipating heat from the heatsink 304, the fins 332 are included on the heatsink 304 to increase the overall surface area of the heatsink 304. The fins 332 may extend from the heatsink 304 at any angle sufficient to dissipate heat. The fins 332 may extend from the heatsink 304 at any distance sufficient to increase the surface area of the heatsink 304, such as at a distance between about 0.1 mm to about 20 mm. The fins 332 may extend from the heatsink 304 such that the fins 332 are planar or offset relative to the rear interconnect mechanism 324. The fins 332 may work in combination with the rear interconnect mechanism 324 to dissipate heat such that the use time of the image capture device 300 is extended before overheating. In some examples, no fins 332 are included so that the heatsink 304 can have a smooth surface such as is shown for the front housing 302.

Figure 3C:
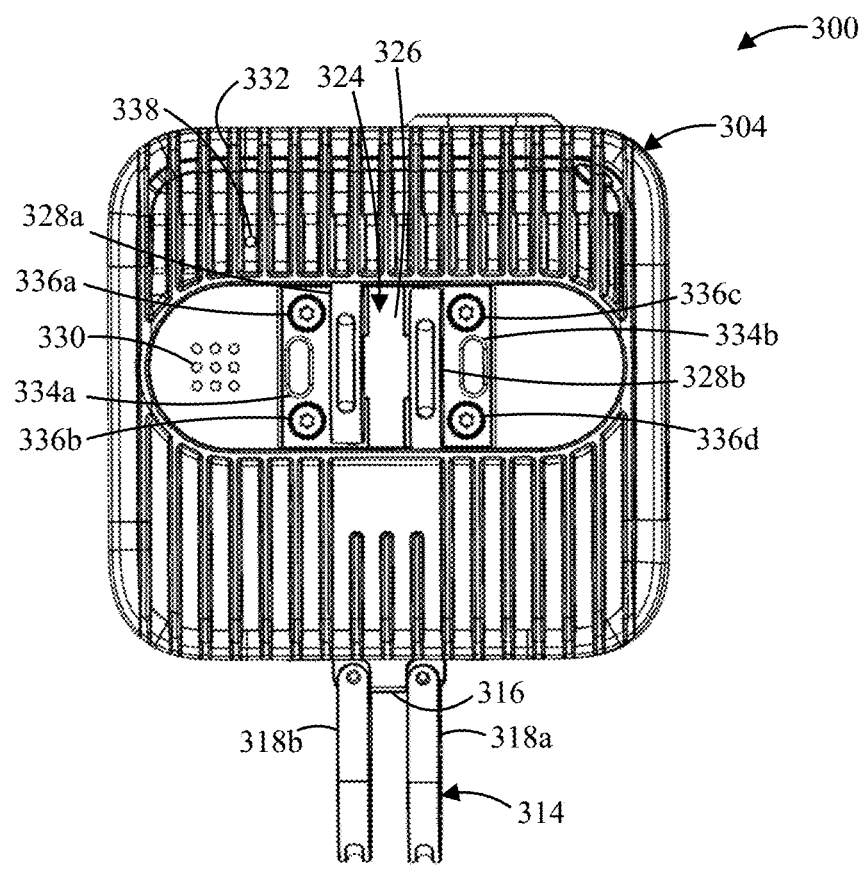
FIG. 3C is a rear view of the image capture device of FIG. 3A with the rear and bottom interconnect mechanisms extended.

FIG. 3C is a rear view of the image capture device 300 of FIG. 3A with the bottom interconnect mechanism 314 and rear interconnect mechanism 324 extended. The rear interconnect mechanism 324 include magnets 334a, 334b to hold the rear fingers 328a, 328b in place when the user desires that the rear interconnect mechanism 324 remain in a closed position. The magnets 334a, 334b may be integrated with the hinge 326 to reduce the number of components during the assembly of the rear interconnect mechanism 324, or the magnets 334a, 334b may be adhered or affixed to the hinge 326 by any means sufficient to connect two components. In other examples, the magnets 334a, 334b may be integrated or directly connected with the heatsink 304 such that the heatsink 304 has the additional functionality of holding rotatable components with magnets 334a, 334b. The magnets 334a, 334b are configured to magnetically hold the rear fingers 328a, 328b because the rear fingers 328a, 328b are made of material sufficient to magnetically interact with magnets 334a, 334b. The magnetic conductivity of the magnets 334a, 334b may be such that the rear fingers 328a, 328b remain in a closed position even when the image capture device 300 is shaken or jostled. The rear fingers 328a, 328b are rotatable about the hinge 326 to an extended position when the user pulls the rear fingers 328a, 328b away from the magnets 334a, 334b. The bottom interconnect mechanism 314 may similarly include magnets (not shown) that have similar functionality to the magnets 334a, 334b.

The rear interconnect mechanism 324 are connected to the heatsink 304 by an arrangement of fasteners 336a, 336b, 336c, 338d at the hinge 326. The fasteners 336a, 336b, 336c, 338d are positioned adjacent to the magnets 334a, 334b such that the fasteners 336a, 336b, 336c, 338d and the magnets 334a, 334b are generally not visible when the rear interconnect mechanism 324 are in a closed position. The fasteners 336a, 336b, 336c, 338d may be any connection feature sufficient to secure a component against a component. For example, the fasteners 336a, 336b, 336c, 338d may include nails, adhesive, screws, bolts, nuts, heat stakes, ultrasound welds, or any combination thereof.

The heatsink 304 includes a rear microphone aperture 338 that is connected with a microphone (e.g., microphone 342, 442 of FIGS. 3E and 4B) that is different than the microphone (not shown) connected with the front microphone aperture 312 (see FIG. 3A). The rear microphone aperture 338 is positioned between fins 332 such that the rear microphone aperture 338 does not inhibit dissipation of heat through the fins 332 by removing one of the fins 332. The rear microphone aperture 338 may have any configuration sufficient to facilitate detection of sound and to prevent water or moisture from entering the image capture device 300. For example, the rear microphone aperture 338 may be connected with a waterproof and/or sound permeable membrane (not shown) that allows sound to be detected by the microphone (not shown) but does not expose internal components of the image capture device 300 to water or moisture. In other configurations, the heatsink 304 includes multiple rear microphone apertures 338 between the fins 332 so that the heatsink 304 can have increased functionality to dissipate heat generated by internal components of the image capture device 300 and to utilize more external surface of the image capture device 300 for external components, such as additional microphone apertures (not shown) and/speaker ports (not shown).

Figure 3D:
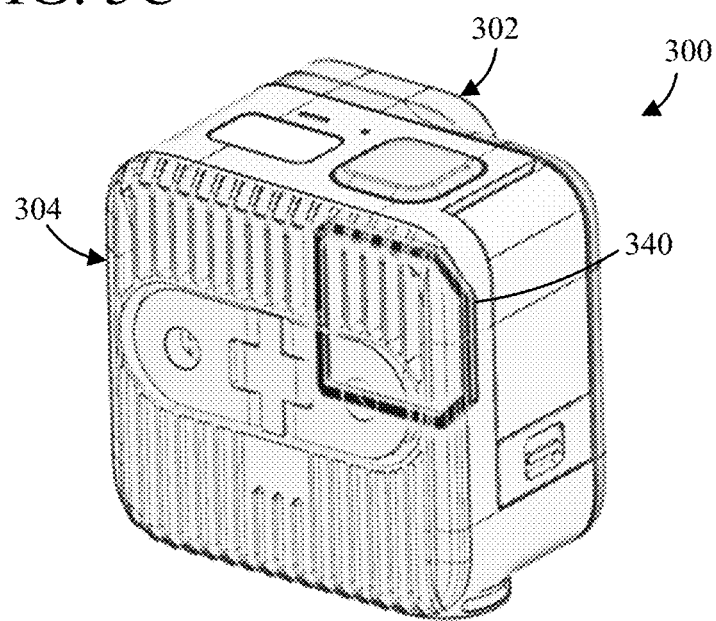
FIG. 3D is a perspective and transparent view of the image capture device of FIG. 3A.

FIG. 3D is a perspective and partially transparent view of the image capture device 300 of FIG. 3A. Between the heatsink 304 and the front housing 302, a gasket 340 is positioned to mitigate the emission of electromagnetic waves from one internal electronic component (e.g., the system on a chip 348 of FIGS. 3E and 3F) that negatively interferes with other electronic components (e.g., the printed circuit board 346 of FIGS. 3E and 3F). The gasket 340 encloses lateral sides of an internal electronic component (e.g., the system on a chip 348 of FIGS. 3E and 3F) that is pressed against or partially integrated with the heatsink 304.

FIG. 3E is a rear view of the image capture device 300 of FIG. 3A with the heatsink 304 removed. The image capture device 300 includes a microphone 342 and a speaker 344 that correspond to the rear microphone aperture 338 and the speaker port 330 of the heatsink 304 (e.g., FIGS. 3B-3C). The microphone 342 and the speaker 344 are connected with the heatsink 304 such that the heatsink 304 functions to ground electricity and/or dissipate heat from the microphone 342 and the speaker 344. Within the front housing 302, a printed circuit board 346 and a system on a chip 348 are separated by the gasket 340 so that electromagnetic waves from the system on a chip 348 do not interfere with other components on the printed circuit board 346 and/or other printed circuit boards (not shown) that contain the WiFi circuit. Fasteners 350a, 350b, 350c secure the printed circuit board 346 and/or the system on a chip 348 to the front housing 302 within the image capture device 300. In some examples, the system on a chip 348 and/or the printed circuit board 346 are connected with the heatsink 304 by fasteners (not shown) so that heat can be dissipated through the fasteners (not shown) to the heatsink 304. The system on a chip 348 includes a chip portion 352 and a thermal interface material 354 that each extend from the system on a chip 348 to the heatsink 304 so that the heatsink 304 can dissipate heat directly from the system on a chip 348. The thermal interface material 354 may be composed of any material sufficient to connect the chip portion 352 to the heatsink 304 and to transfer heat.

The front housing 302 includes an opening 356 that is generally square for the purpose of connecting the heatsink 304 and the front housing 302 to contain the components of the image capture device 300. The opening 356 may have any shape sufficient to allow the heatsink 304 to connect with the front housing 302. The shape and/or configuration of the opening 356 may be chosen such that the connection between the front housing 302 and the heatsink 304 has a connection that is a waterproof seal. For example, the opening 356 may have a shape of a circle, rectangle, triangle, or any other shape. The heatsink 304 and the front housing 302 may have any connection at the opening 356 that will prevent water or debris from entering the image capture device 300. For example, the connection at the opening 356 may be secured by adhesive, fasteners, bolts, or any combination thereof.

FIG. 3F is a cross sectional view of the image capture device 300 of FIG. 3A along line VI-VI. Between the heatsink 304 and the front housing 302, which is housed within the image capture device 300, a sensor 358 is paired with and positioned behind the lens assembly 306 so that images can be detected through the lens assembly 306 by the sensor 358. The sensor 358 may be connected with the heatsink 304 either directly via a conductor (not shown) or through two or more other intervening components that are thermally conductive.

Behind an external surface 360 of the heatsink 304, the system on a chip 348 contacts and/or is integrated with the heatsink 304 at an internal surface 362 so that heat is transferred to the heatsink 304 and dissipated to the external surface 360. Specifically, the chip portion 352 is partially integrated with the heatsink 304. In some examples, the system on a chip 348 only contacts the heatsink 304 at the chip portion 352 and is not integrated with the heatsink 304. In some examples, the system on a chip 348 is spaced a distance from the heatsink 304, and the system on a chip 348 and the heatsink 304 are connected via a conductor (not shown) so that additional components can be positioned between the system on a chip 348 and the heatsink 304. Additionally, the gasket 340 contacts the heatsink 304 so that the system on a chip 348 is completely encased by the gasket 340 and the heatsink 304, which prevents electromagnetic waves from interfering with the other components on the printed circuit board 346.

FIG. 4A is a rear view of the heatsink 400. FIG. 4B is a front view of the heatsink 400 of FIG. 4A. The heatsink 400 may be similar to the heatsink 304 of FIGS. 3A-3F. The heatsink 500 may be used with any image capture device described herein, such as the image capture devices 100, 300 of FIGS. 1A-1B and 3A-3F. The heatsink 400 includes a speaker port 430 that is positioned in a receiver 431 and is positioned between sets of fins 432. Within the receiver 431, fasteners 436a, 436b are utilized to secure external components, such as the speaker port 430, within the receiver 431, and the fasteners 436a, 436b may be similar to the fasteners 336a, 336b, 336c, 336d of FIG. 3C. The receiver 431 may include additional components, such as additional speakers 444, microphones 442, buttons (not shown), or any combination thereof.

Between lateral sets of the fins 432, indents 433 are positioned between the fins 432 so that the heatsink 400 has additional surface area to dissipate heat. A rear microphone aperture 438 is positioned within the indents 433, and additional microphone apertures (not shown), speaker ports and/or apertures (not shown), or any other external component (not shown) may be positioned within other portions of the indents 433 so that additional external surface area of the heatsink 400 is utilized. The fins 432, the speaker port 430, and the rear microphone aperture 438 may be similar to the fins 332, the speaker port 330, and the rear microphone aperture 338 of FIGS. 3B and 3C.

The heatsink 400 includes a gasket 440 that is configured to block electromagnetic waves from one or more internal components (e.g., the printed circuit board 346 of FIGS. 3E and 3F). The gasket 340 may be adhered to the heatsink 400 by any technique sufficient to connect two components, such as adhesive, double sided tape, or a combination of both. The gasket 440 may alternatively be adhered or connected to an internal component (e.g., the system on a chip 348 or the printed circuit board 346 of FIGS. 3E and 3F), and the gasket 440 may be pressed against the heatsink 400 without any adhesion. The gasket 440 may be composed of any material sufficient to block electromagnetic waves. For example, the gasket 440 may be composed of a rubber, a thermoplastic, a thermoset, a foam, or any combination thereof. The gasket 440 may have any shape sufficient to enclose sides of an internal component that generates electromagnetic waves. For example, the gasket 400 may have a shape of a circle, square, rectangle, triangle, trapezoid, or any combination thereof.

The heatsinks 400 includes a microphone 442 that is configured to receive sound through the rear microphone aperture 438. The microphone 442 may have any configuration sufficient to receive sound. The microphone 442 may be electrically and/or thermally connected to the heatsink 400 such that the heatsink 400 can function to ground electricity and dissipate heat. The microphone 442 may be connected to the same circuit board as a speaker 444 so that space is conserved within an image capture device, such as image capture device 300 of FIGS. 3A-3F. The speaker 444 may have any configuration sufficient to emit sound through the speaker port 430, and the speaker 344 may be electrically and/or thermally connected to the heatsink 400 such that the heatsink 400 can function to ground electricity and dissipate heat.

On the heatsink 400, an external surface 460 may include additional components or different configurations of the fins 432 such that a maximum amount of surface area is utilized on the heatsink 400 when paired with a front housing (e.g., the front housing 302 of FIGS. 3A-3E). Opposite of the external surface 460, an internal surface 462 may include any other additional component sufficient to dissipate heat from other internal components, conduct electricity from one or more internal or external components, or to block electromagnetic waves from interfering with other internal components. Extending from the internal surface 462 to the external surface 460, fastener apertures 464a, 464b, 464c, 464d are positioned such that fasteners (e.g., fasteners 336a, 336b, 336c, 336d of FIG. 3C) are insertable into the fastener apertures 464a, 464b, 464c, 464d to secure one or more external components to the heatsink 304.

Figure 5A:
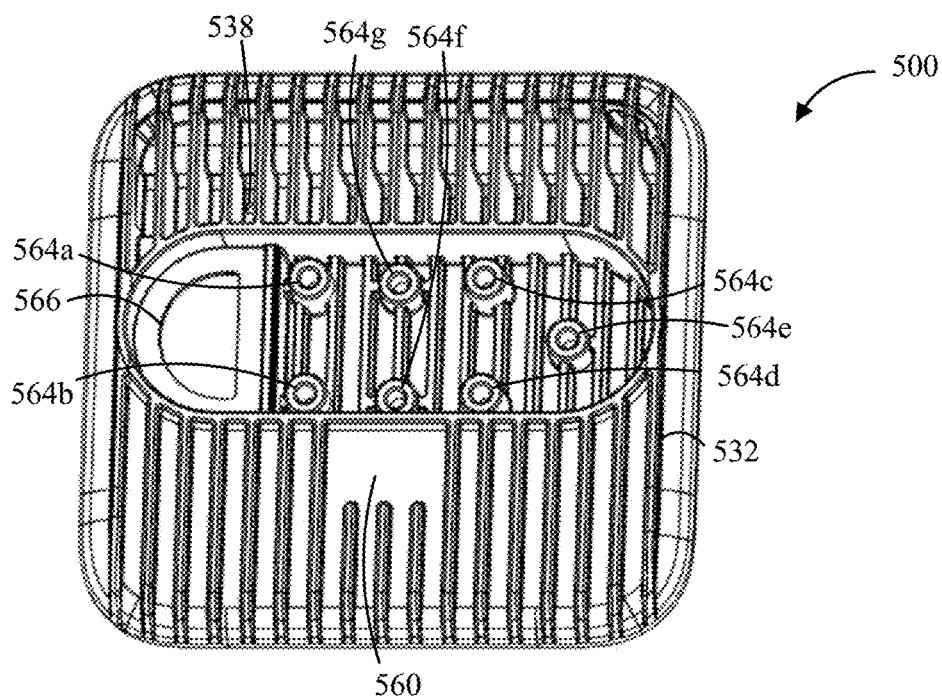
FIG. 5A is a perspective view of a heatsink.
Figure 5B:
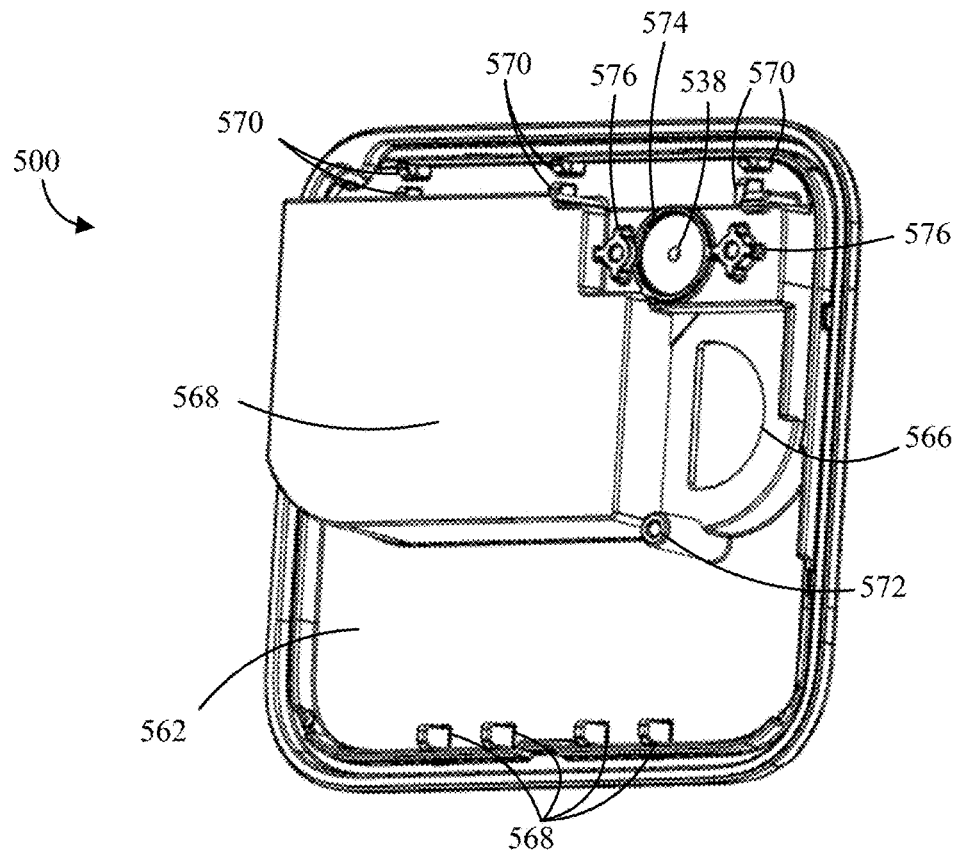
FIG. 5B is perspective view of a heatsink of FIG. 5A.

FIG. 5A is a perspective view of a heatsink 500. FIG. 5B is perspective view of the heatsink 500 of FIG. 5A. The heatsink 500 may be similar to the heatsinks 304, 400 of FIGS. 3A-4B. The heatsink 500 may be used with any image capture device described herein, such as the image capture devices 100, 300 of FIGS. 1A-1B and 3A-3F. The heatsink 500 includes fins 532 that are configured to increase surface area of the heatsink 500 so that heat dissipation can be maximized. The heatsink 500 includes a rear microphone aperture 538 that is configured for use with an internal microphone (e.g., microphones 342, 442 of FIGS. 3E and 4B), and the rear microphone aperture 538 may be used with any other component that utilizes a communication channel between the inside of an image capture device and the external environment, such as a speaker or indicator light.

The heatsink 500 includes fastener apertures 564a, 564b, 564c, 564d, 564e, 564f that function to allow one or more external components to be secured to an external surface 560 or an internal surface 562 of the heatsink 500. For example, an interconnect mechanism, such as rear interconnect mechanism 324 of FIGS. 3B and 3C, may be secured to the external surface 560 of the heatsink 500 such that the heatsink 500 is connectable with one or more external accessories (not shown). The fastener apertures 564a, 564b, 564c, 564d, 564e, 564f may be used to assist with connecting one or more internal components directly to the heatsink 500 so that the internal components can dissipate heat or electricity to the heatsink 500. In some examples, the fastener apertures 564a, 564b, 564c, 564d, 564e, 564f may be utilized to connect multiple components in series with a long fastener (not shown). For examples, a long fastener (not shown) may be inserted into one or more of the fastener apertures 564a, 564b, 564c, 564d, 564e, 564f such that the long fastener extends through the heatsink 500 to one or more internal circuit boards, such as the printed circuit board 346 of FIGS. 3E and 3F.

Similarly to the rear microphone aperture 538, the heatsink 500 includes an opening 566 that functions to allow one or more internal components have a communication channel between the inside of the image capture device and the external environment. In some examples, one or more other components, such as a speaker port (e.g., the speaker port 330 of FIGS. 3B and 3C) and/or a membrane (not shown), may be paired with the opening 566 to provide a pathway for sound communication between the inside of the image capture device and the external environment while the image capture device remains waterproof. In other examples, the opening 566 may be paired with one or more buttons, switches, screens, or flashers that are generally housed within the image capture device but have an external surface component protruding from the heatsink 500. The opening 566 may have any size or configuration to allow for integration of a component that utilizes external surface area of the image capture device. In some examples, the opening 566 comprises about 10 percent to about 50 percent of the total surface area of the heatsink 500 and may be wholly or partially surrounded by fins 532.

On the internal surface 562 of the heatsink 500, an extension 568 protrudes from the internal surface 562 to improve the mass of the heatsink 500 so that additional heat can be dissipated to heatsink 500. Additionally, the extension 568 may extend toward one or more internal components to provide a connection surface to dissipate heat and/or to block internal electromagnetic interference between internal components, such as between the printed circuit board 346 and the system on a chip 348. In some examples, one or more of the fastener apertures 564a, 564b, 564c, 564d, 564e, 564f may extend through the extension 568 and/or the internal surface 562 to assist with securing one or more internal components.

The heatsink 500 includes several pairing connectors 570 that are configured to connect with one or more electric components, such as the button 308 of FIG. 3A, so that the heatsink 500 can act as a ground for the one or more electrical components (not shown). The pairing connectors 570 may have any configuration sufficient to connect with the one or more electrical components (not shown). For example, the pairing connectors 570 may include four connectors (not shown) instead of the pairing connectors 570 (i.e., two connectors) so that additional surface area contacts the one or more electrical components (not shown). The electrical components (not shown) may directly contact the pairing connectors 570 or a wire (not shown) may connect the pairing connectors 570 with the one or more electrical components (not shown). In some examples, the pairing connectors 570 are connected to a single electrical component that extends across the heatsink 500, and in other examples, the pairing connectors 570 connect with two or more electrical components that are connected or integrated with a housing (e.g., front housing 302 of FIG. 3A) of an image capture device.

Adjacent to the opening 566, a fastener aperture 572 is included that secures an internal component, such as the microphones 342, 442 of FIGS. 3E-3F and 4B, to the heatsink 500 such that the internal component is integrated with the heatsink 500 electrically and thermally. For example, a fastener (e.g., the fastener 436a, 436b of FIG. 4B) may secure the internal component to the heatsink 500, and since the fastener (e.g., the fastener 436a, 436b of FIG. 4B) may be made of an electrically and/or thermally conductive material (e.g., metal, plastic, and/or ceramic), the fastener (e.g., the fastener 436a, 436b of FIG. 4B) provides an energy pathway to the heatsink 500 at the fastener aperture 572. In other examples, the fastener aperture 572 may have a configuration of an extended portion, similarly depicted as the pairing connectors 570, and a wire or conductor (not shown) may provide the electrical pathway between the heatsink 500 and the internal component.

Between the pairing connectors 570 and the opening 566, a microphone connector 574 and internal fastener apertures 576 are positioned to secure a microphone (e.g., the microphone 342, 442 of FIGS. 3E and 4B) or another component to the heatsink 500. The internal fastener apertures 576 in combination with fasteners (not shown) are configured to secure a microphone against the heatsink 500 such that the microphone does not shift while the image capture device is in use. Additionally, the connection between the fasteners (not shown) and the internal fastener apertures 576 provides a thermal and/or electrical connection so that the heatsink 500 can dissipate heat from the microphone (e.g., the microphone 342, 442 of FIGS. 3E and 4B) and act as a ground for the microphone (e.g., the microphone 342, 442 of FIGS. 3E and 4B).

Any number of internal fastener apertures 576 sufficient to connect the microphone (e.g., the microphone 342, 442 of FIGS. 3E and 4B) and the heatsink 500 may be included. The internal fastener apertures 576 may additionally connect the microphone (e.g., the microphone 342, 442 of FIGS. 3E and 4B) and an additional internal component, such as a circuit board (not shown), of the image capture device. For example, the microphone (e.g., the microphone 342, 442 of FIGS. 3E and 4B) and the additional internal component may be connected and stacked by the fastener and internal fastener apertures 576 to reduce the number of parts of the heatsink 500 and/or image capture device. In some examples, the internal fastener apertures 576 are free of contact with the microphone (e.g., the microphone 342, 442 of FIGS. 3E and 4B) and are configured to secure one or more adjacent components to the heatsink 500 so that the one or more adjacent components can dissipate heat and/or electricity to the heatsink 500.

The microphone connector 574 functions to provide a direct connection between a microphone and the heatsink 500 to dissipate heat, improve waterproofing, and dissipate electricity from the microphone. Between the microphone and the microphone connector 574, a membrane or conductive adhesive may be included that improves waterproofing and/or allows electrical and/or thermal communication between the microphone and the heatsink 500. The microphone connector 574 and the microphone may be connected by any technique or means sufficient to allow electrical and/or thermal connection between the microphone and heatsink 500 such that audio reception from the external environment is not inhibited.

The heatsink 500 functions to dissipate heat from internal components to the external environment so that an associated image capture device, such as the image capture devices 100, 300 of FIGS. 1A-1B and 3A-3F, can operate for a longer period of time. The heatsink 500 may include any number of fins 532 sufficient to extend the operation time of an image capture device, such as the image capture devices 100, 300 of FIGS. 1A-1B and 3A-3F. For example, the heatsink 500 may include from 3 to 30 fins 532. In some examples, the fins 532 extend at an angle so that additional components can be integrated at a particular area of the heatsink 500. In other examples, the fins 532 may include one or more breaks between the lengthwise portions of the fins 532 so that the fins 532 have additional surface area to dissipate heat. In some examples, no fins 532 are included on the heatsink 500 so that the heatsink 500 has a smooth surface and can integrate additional components onto the external surface 560.

As the heatsink 500 is composed of a material chosen to conduct thermal energy, the materials of the heatsink 500 can also be chosen to additionally conduct electrical energy so that the heatsink 500 can function as a ground for electrical components. The heatsink 500 can be made of any material that is electrically or thermally conductive. For example, the heatsink 500 is made of one or more of aluminum, copper, zinc, magnesium, steel, or any combination thereof. The heatsink 500 may be plated with one or more materials, such as nickel, to improve electrical properties for grounding. Additionally, the materials of the heatsink 500 may be chosen such that the heatsink 500 provides a physical barrier from components emitting undesirable electromagnetic waves, such as from the system on a chip 348 of FIGS. 3E and 3F. When paired with a gasket (e.g., gasket 340, 440 of FIGS. 3D-3F and 4B), the heatsink 500 and gasket can block the electromagnetic waves from interfering with other internal electronics or chips within an image capture device, such as the image capture devices 100, 300 of FIGS. 1A-1B and 3A-3F.

The heatsink 500 may include any number of the rear microphone apertures 538 or the openings 566 sufficient to allow internal components to communicate via audio waves to the external environment. The rear microphone apertures 538 or the openings 566 may be paired with one or more waterproof membranes (not shown) that are configured to allow audio waves into or out of the image capture device and protect the internal components from water or moisture in the external environment. The heatsink 500 may additionally include buttons (not shown) or electrical input/output ports that are integrated with the heatsink 500 so that the heatsink 500 can have additional surface area without sacrificing space used for the integration of other external surface components.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising: a housing; a heatsink that forms an integral portion of the housing and is configured to draw heat from a heat generating component; a circuit board enclosed by the housing and comprising a chip; an image sensor separated from the circuit board, configured to generate heat, and connected with the heatsink through a conductor; and a gasket that connects the heatsink and the circuit board, wherein the gasket encloses sides of the chip and the heatsink encloses a top of the chip so that electromagnetic interference from the chip does not affect other components the image sensor.

2. The image capture device of claim 1, wherein the housing and the heatsink are sealed so that water is prevented from entering an inside of the housing.

3. The image capture device of claim 1, wherein the heatsink comprises one or more audio components that are integrated within walls of the heatsink.

4. The image capture device of claim 1, wherein the heatsink comprises external fins that are positioned on an external surface of the heatsink and are configured to dissipate heat.

5. The image capture device of claim 4, wherein the external fins extend from a first edge of the heatsink that contacts the housing to a second edge of the heatsink that contacts the housing.

6. The image capture device of claim 5, wherein the housing comprises an open side so that the image capture device is enclosed on all sides except for the open side, and wherein the heatsink connects with the housing so that the open side is closed by the heatsink.

7. The image capture device of claim 1, wherein all of the external fins of the heatsink are exposed to an external environment.

8. An image capture device, comprising: a housing that comprises an opening; one or more electrical components; and a heatsink composed of an electrically conductive material and configured to draw heat from an image sensor of the image capture device, the heatsink comprising: one or more connectors configured as a ground to conduct electricity between the heatsink and the electrical component; and fins extended along an external surface of the heatsink, free of contact with the one or more connectors and/or electrical component, and configured to dissipate heat from the image sensor and electricity from the electrical component.

9. The image capture device of claim 8, wherein the heatsink is connected with the housing at the opening so that the fins of the heatsink extend outside of the housing.

10. The image capture device of claim 8, wherein the heatsink and the housing form a body that houses the one or more electrical components.

11. The image capture device of claim 8, wherein the one or more electrical components comprise a speaker, a microphone, a button configured to actuate; display, or any other component that utilizes electricity.

12. The image capture device of claim 8, wherein the one or more electrical components are positioned at the external surface of the housing, or wherein the one or more electrical components are encased wholly within the housing.

13. The image capture device of claim 8, wherein the one or more electrical components are encased partially within the housing and are partially integrated with the external surface of the housing.

14. The image capture device of claim 8, wherein the heatsink further comprises:
    an interconnect mechanism configured to rotate relative to the heatsink and to connect with an external accessory.

15. A heatsink, comprising:
    fins that extend from the heatsink;
    an indent defined within the fins; and
    an interconnect mechanism connected with the heatsink at the indent, the interconnect mechanism composed of a material configured to dissipate heat, and the interconnect mechanism configured to rotate relative to the indent between open and closed positions.

16. The heatsink of claim 15, further comprising:
a microphone port integrated within the fins or positioned behind or between the fins.

17. The heatsink of claim 16, wherein a microphone and the heatsink are connected electrically so that the heatsink is configured to conduct electricity from the microphone.

18. The heatsink of claim 17, wherein a speaker and the heatsink are connected electrically so that the heatsink is configured to conduct electricity from the speaker.

19. The heatsink of claim 15, further comprising:
a speaker port integrated within the fins or positioned behind or between the fins.

20. The heatsink of claim 15, wherein the interconnect mechanism comprises fingers that rotate relative to the heatsink and to connect with an external accessory.

* * * * *